United States Patent [19]

Rehrig

[11] Patent Number: 4,822,066
[45] Date of Patent: Apr. 18, 1989

[54] STRENGHTENED PLASTIC DOLLY

[75] Inventor: Houston Rehrig, Pasadena, Calif.

[73] Assignee: Rehrig International, Inc., Richmond, Va.

[21] Appl. No.: 107,305

[22] Filed: Oct. 13, 1987

Related U.S. Application Data

[63] Continuation-in-part of Ser. No. 858,671, May 2, 1986, Pat. No. 4,720,115.

[51] Int. Cl.⁴ .................................................. B62B 3/02
[52] U.S. Cl. .............................. 280/79.11; 108/56.1; 108/901; 403/231
[58] Field of Search ............... 280/79.1 R, 79.1 A, 280/79.3; 108/901, 56.1; 403/408.1, 231, 375

[56] References Cited

U.S. PATENT DOCUMENTS

| 930,078 | 8/1909 | Mix | 403/231 |
|---|---|---|---|
| 981,372 | 1/1911 | Brodt | 403/231 |
| 1,184,079 | 5/1916 | D'Arcy | 403/231 |
| 2,414,277 | 1/1947 | Shepard | 280/79.1 R |
| 3,814,778 | 6/1974 | Hosoda et al. | 108/901 |
| 3,902,692 | 9/1975 | Skinner | 108/901 |
| 4,316,419 | 2/1982 | Cupido | 108/56.1 |
| 4,720,115 | 1/1988 | Rehrig | 108/901 |

FOREIGN PATENT DOCUMENTS 681259  5/1930  France ........................... 280/79.1

*Primary Examiner*—David M. Mitchell
*Attorney, Agent, or Firm*—Banner, Birch, McKie & Beckett

[57] ABSTRACT

An improved plastic dolly is disclosed. The plastic dolly includes a pair of longitudinal side members and a pair of transverse end members coupled by lap joints to form a preferably rectangular frame. The various members are formed of high density polyethylene and are strengthened by ribs. The lap joints are rabbeted to form stronger lap joints. The longitudinal side members are strengthened by disposing a metal bar in a groove at the outside edge of the longitudinal side members, and the transverse end members are strengthened by forming its ribs in a pyramidal or triangular shape toward the center of the transverse end members.

30 Claims, 5 Drawing Sheets

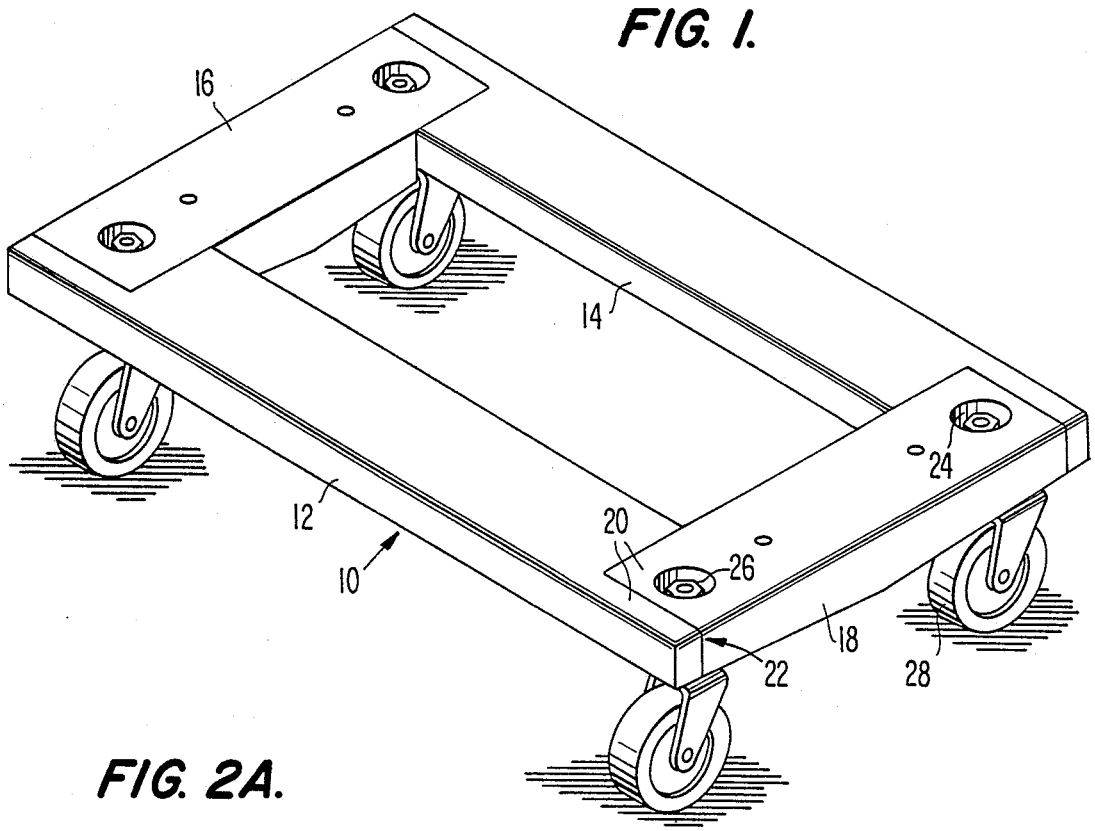
FIG. 1.
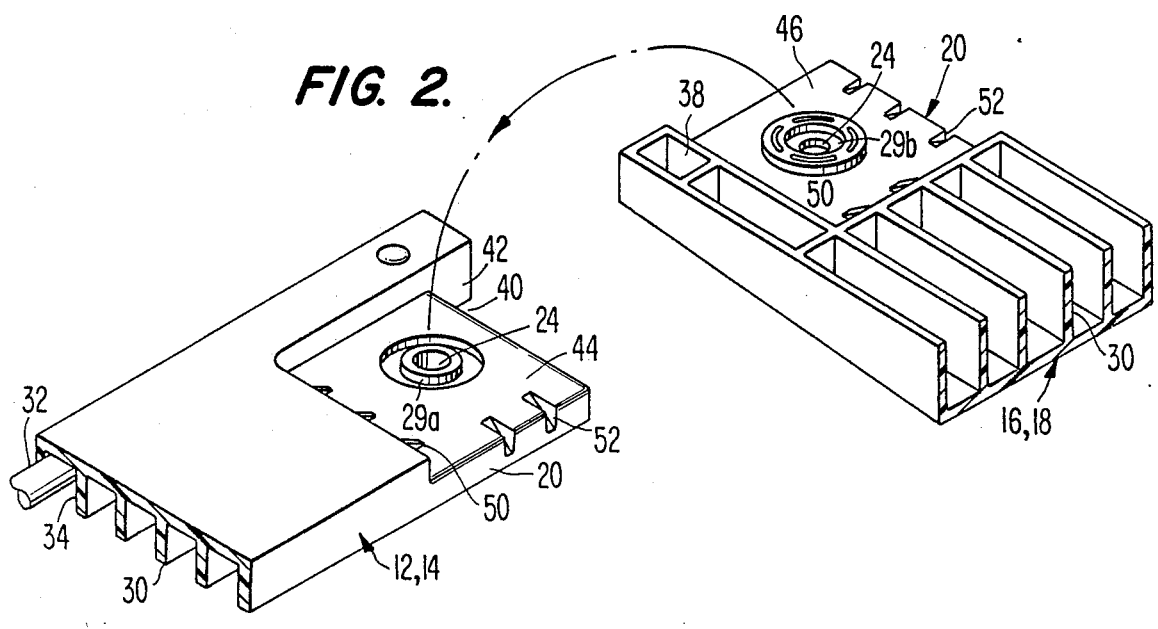
FIG. 2A.
FIG. 2.

STRENGTHENED PLASTIC DOLLY

CROSS REFERENCE TO RELATED APPLICATION

This application is a continuation-in-part of Ser. No. 858,671 filed on May 2, 1986 and entitled "Plastic Dolly" now U.S. Pat. No. 4,720,115.

TECHNICAL FIELD

The present invention pertains to plastic dollies. More particularly, the present invention pertains to an improved plastic dolly having stronger sides.

BACKGROUND OF THE INVENTION

Typically, dollies are made of relatively heavy, solid wood rectangles or wood slats with a caster fastened on the underside of each corner. These prior art dollies used, for example, metal corner plates or anchoring plates to add strength to the dolly frame, such as disclosed in U.S. Pat. No. 1,184,079 to D'Arcy and U.S. Pat. No. 2,414,277 to Shepard, Jr. et al. However, these plates are insufficient, in that they only provide reinforcement to a limited area, that is, only at the corners of the dolly. Another disadvantage of this construction is that the dolly caster is typically fastened with four bolts in order to maintain the rigidity of the dolly frame. Since all the bolts must be removed in order to disassemble the dolly, any repair or replacement of a worn element is a time consuming job.

Plastic dollies are preferable to wooden dollies as plastic is easier to clean and is less dense than wood. Thus plastic dollies are lightweight. Plastic dollies are also often cheaper than wooden dollies and are easier to manufacture. However, plastic dollies suffer from a lack of strength. Absent strengthening devices, a plastic dolly is not as strong as a wooden dolly.

U.S. Pat. No. 4,060,252 to Mowery and U.S. Pat. No. 4,103,857 to Levenhagen both disclose one piece plastic transfer devies. Mowery shows a plastic dolly with plastic strengthening ribs formed on the underside of the dolly. Levenhagen discloses a one piece plastic pallet having a steel rod for reinforcing the perimeter of the pallet. The primary disadvantage to these devices is that they are expensive to use since the entire device must be scrapped when only a portion of it is damaged.

SUMMARY OF THE INVENTION

It is an object of the present invention to provide a plastic dolly with reinforcing ribs on all four sides.

It is another object of the present invention to provide a plastic dolly with reforcement elements along substantially the entire length of the side members to add strength and rigidity.

It is another object of the present invention to provide a plastic dolly with strengthening ribs along the end members of the plastic dolly to provide strength and rigidity.

It is another object of the present invention to provide a plastic dolly with elements which may be easily disassembled for repair or replacement, and which is simple to manufacture.

It is another object of the present invention to provide a plastic dolly which requires only one caster bolt per caster to facilitate ease of assembly and disassembly.

The above and other objects are accomplished by the plastic dolly of lightweight, yet substantially durable and sturdy construction. The dolly includes a pair of longitudinal side members and a pair of transverse end members coupled by lap joints to form a frame preferably rectangular in shape. The various members are molded in a honeycomb/cellular configuration to conserve product weight and materials. The end portions of each of the members are rabbeted and interfit to form a lap joint at each corner. The lap joints are securely fastened together at the corners of the frame. The side members and end members all have end portions at each end thereof. The end portions form the four corner joints. Each of the four corner joints includes a caster fastening bolt which securely fastens the joints together and carries a conventional dolly caster wheel. The side and end members of the dolly are formed of a high density polyethylene and are formed having a series of ribs disposed on their undersides. High density polyethylene may be used, rather than ABS, because the strengthening ribs provide the required strength, rigidity, and durability. The end portions of the side and end members are rabbeted, and the side members have part of their end portions removed to allow a complementary part of the end members to extend to their full depth to form a stronger lap joint. The end members are shortened along their entire width at each end by an amount equal to a complementary portion of the side member. This permits the end and side members to securely interlock while maintaining a uniform top surface. The coupling of the side and end members provides a key-like fit. If longer end or side members are used, for example 24 inches long, then a reinforcing U-shaped metal channel or a metal bar may be disposed within a groove on the outside edge of the members to strengthen and add rigidity to the dolly. Where shorter members are used, such as 18 inches long, then additional strength and rigidity may be provided by forming the ribs on the underside of the members with increasing depths toward the center and away from the ends of the members to form a triangular or pyramidal shape. In one preferred embodiment of the plastic dolly, the side members are longer and use metal reinforcing bars, and the end members are shorter and use the pyramidal rib structure to reinforce the plastic dolly. This design exhibits high strength, rigidity, and durability while being lightweight and permitting easy repair or replacement of the dolly elements.

Various additional advantages and features of novelty which characterize the invention are further pointed out in the claims that follow. However, for a better understanding of the invention and is advantages, reference should be made to the accompanying drawings and descriptive matter which illustrate and describe preferred embodiments of the invention.

BRIEF DESCRIPTION OF THE DRAWINGS

FIG. 1 is a perspective view of a plastic dolly according to the present invention.

FIG. 2 is an upside down perspective view of the plastic dolly of FIG. 1.

FIG. 2a is a perspective view of a U-shaped metal channel reinforcement device.

DETAILED DESCRIPTION OF PREFERRED EMBODIMENTS

Figure 3:
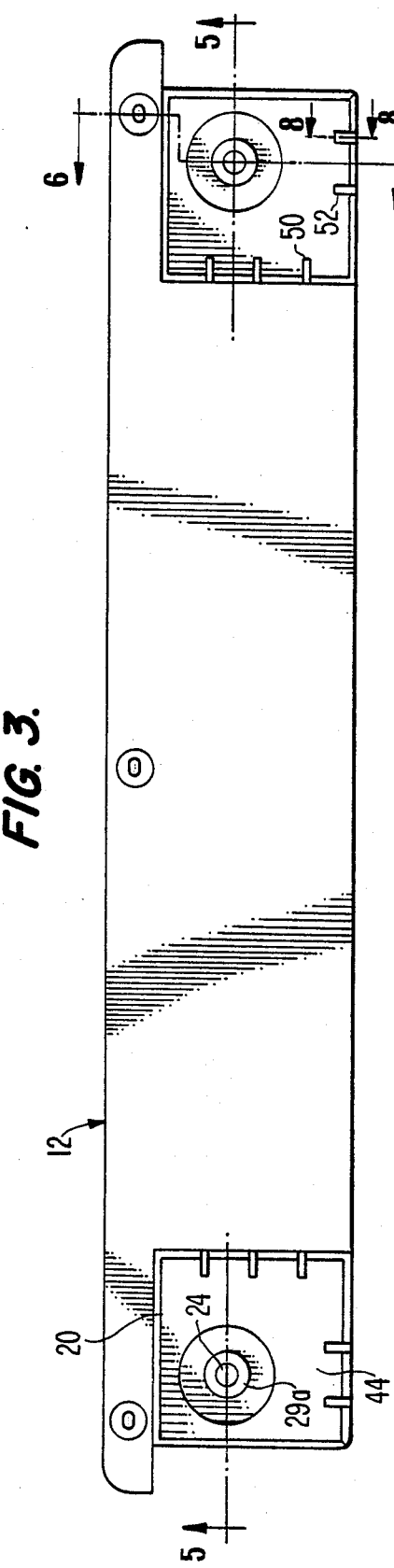
FIG. 3 is a top view of the longitudinal side member of the plastic dolly of FIG. 1.

Referring to FIG. 1, plastic dolly 10 is shown. Dolly 10 includes longitudinal side members 12, 14, illustrated in FIGS. 3-8, and transverse end members 16, 18, illustrated in FIGS. 9-14, coupled to form a frame, preferably rectangular in shape. Of course, other numbers of side members could be used to produce dollies of other shapes and other quadrilateral shapes may be used. Members 12, 14, 16, 18 each have two end portions 20 disposed at either end. End portions 20 of adjacent longitudinal side members and transverse end members are coupled to form a lap joint 22 illustrated in FIG. 1. Preferably, end portions 20 are rabbeted, as explained below, and members 12, 14, 16, 18 are molded from a high density polyethylene. The design of the present invention obviates the need to use the more rigid and expensive ABS. The members 12, 14, 16, 18 may all be molded in a honeycomb/cellular configuration so as to conserve product weight and materials.

Each of the four corner lap joints 22 includes caster fastening hole 24 for receiving caster bolt 26 which securely fastens the corner joints together. Each caster bolt 26 carries a respective dolly caster wheel 28. This construction permits the disassembly of the entire dolly upon the removal of only four bolts 26, thus permitting easy repair or replacement of any of the dolly elements.

To provide additional strength to the lap joint, it is contemplated that raised annular flange 29a be formed in the upper surface of each end portion 20 of side members 12, 14, surrounding caster fastening hole 24. Circular indentation 29b is formed on the lower surface of each end portion 20 of end members 16, 18 surrounding their caster fastening holes. Flange 29a and indentation 29b are shaped such that each flange 29a fits snugly within its respective indentation 29b when the lap joints are fit together. Caster fastening bolt 26 runs through both flange 29a and indentation 29b, thus providing increased strength and rigidity for the lap joints.

Figure 8:
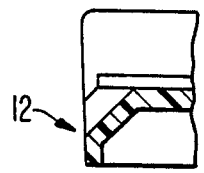
FIG. 8 is a sectional view of the longitudinal side member taken along line 8—8 of FIG. 3.
Figure 9:
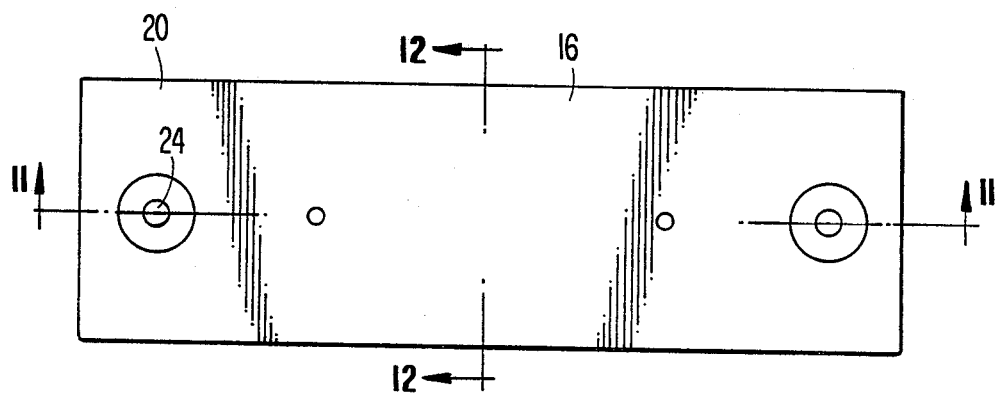
FIG. 9 is a bottom view of the transverse end member of the plastic dolly of FIG. 1.
Figure 11:
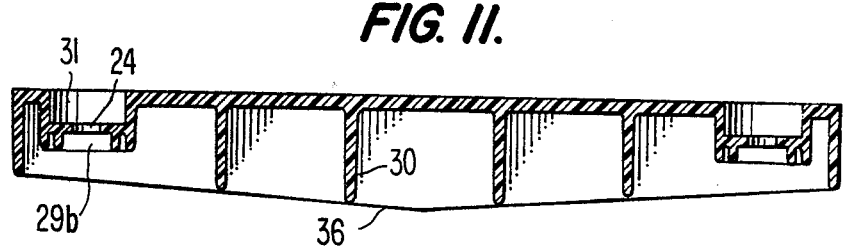
FIG. 11 is a sectional view of the transverse end member taken along line 11—11 of FIG. 9.
Figure 12:
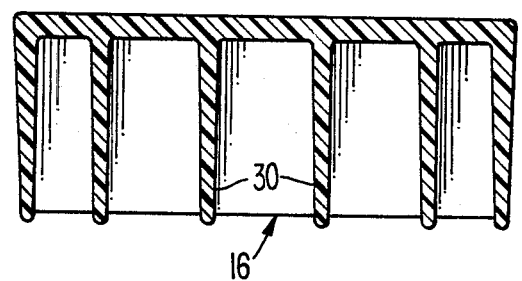
FIG. 12 is a sectional view of the transverse end member taken along line 12—12 of FIG. 9.

Side and end members 12, 14, 16, 18 may include recess 31 formed in the upper surface of the members, as illustrated in FIG. 11. Recess 31 is shaped to accommodate a caster wheel so that the dollies may be conveniently stacked for storage, etc., without having one dolly roll off the dolly beneath it. Side and end members may also have a beveled edge as illustrated in FIG. 8.

Figure 10:
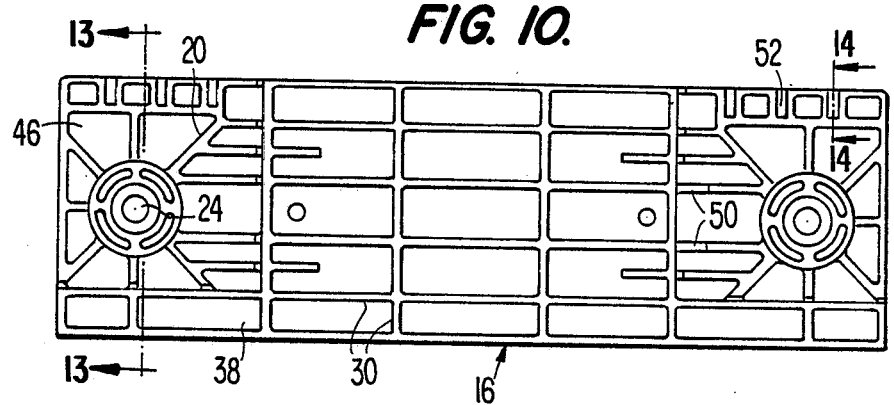
FIG. 10 is a top view of the transverse end member.

In the embodiment illustrated in the figures, longitudinal side members 12, 14 are longer than transverse end members 16, 18. All members 12, 14, 16, 18 are strengthened by a plurality of reinforcing ribs 30 which extend along substantially the entire length of the members as shown in FIGS. 4 and 10. In addition, the rib extend throughout substantially the entire depth of the members as shown in FIGS. 2, 5, 7, 11, 12, and 13. Longitudinal side members 12, 14 are further strengthened by reinforcement element 32 as shown in FIG. 2. Reinforcement element 32 preferably includes a U-shaped metal channel or a metal bar, which is disposed in groove 34 located adjacent the outer edge of longitudinal side members 12, 14. Preferably, groove 34 and reinforcement element 32 extend the entire length of longitudinal side members 12, 14. Where reinforcement element 32 is a U-shaped metal channel, it may be riveted or bolted in groove 34 through elongate holes therein shown in FIGS. 3 and 4. On the top surface of longitudinal side members 12, 14, the elongate holes are countersunk. Transverse end members 16, 18 are further strengthened by forming the reinforcing ribs in a triangular or pyramidal profile 36 toward the middle of transverse end members 16, 18 as best shown in FIG. 11. Alternatively, the metal bar may be disposed in a groove located adjacent the outer edge of transverse end members 16, 18. Likewise, where longitudinal side members 12, 14 are relatively short, reinforcement may be provided by forming reinforcing ribs in a triangular or pyramidal profile toward the middle of the members.

Figure 4:
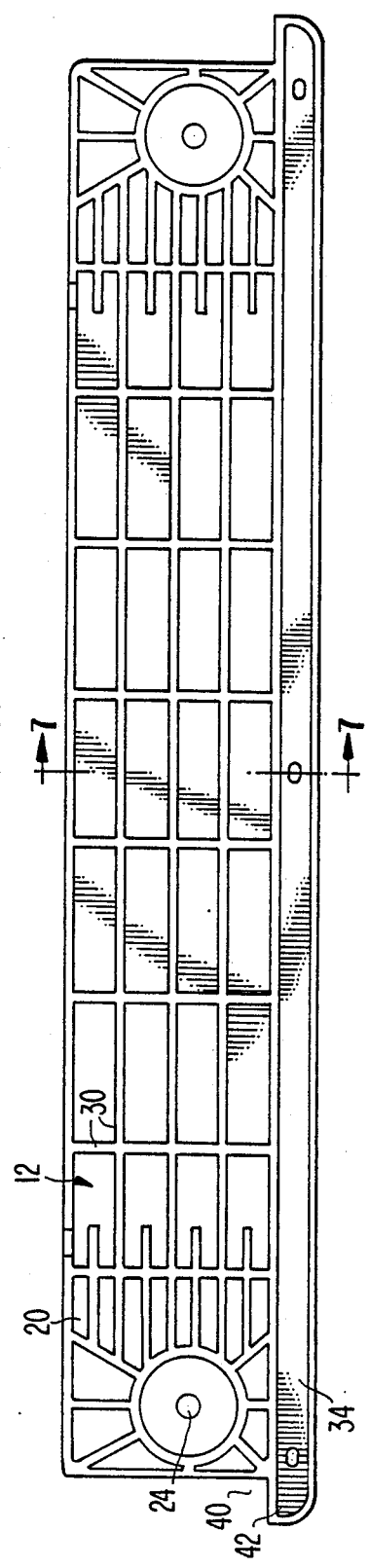
FIG. 4 is a bottom view of the longitudinal side member.
Figure 5:
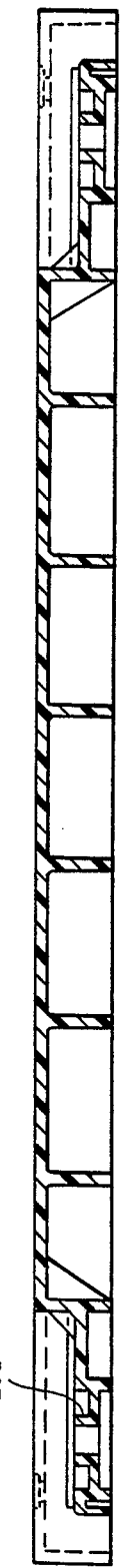
FIG. 5 is a sectional view of the longitudinal side member taken along line 5—5 of FIG. 3.
Figure 6:
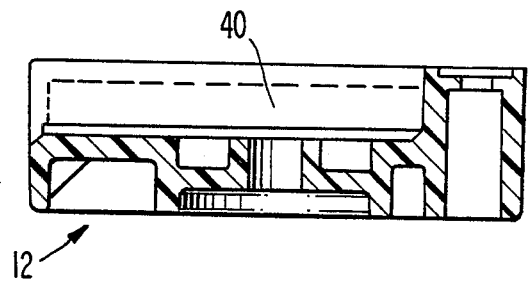
FIG. 6 is a sectional view of the longitudinal side member taken along line 6—6 of FIG. 3.
Figure 7:
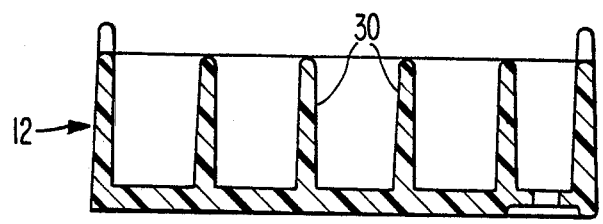
FIG. 7 is a sectional view of the longitudinal side member taken along line 7—7 of FIG. 4.
Figure 13:
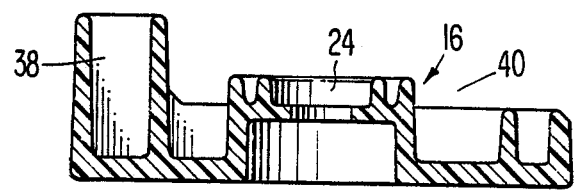
FIG. 13 is a sectional view of the transverse end member taken along line 13—13 of FIG. 10.
Figure 14:
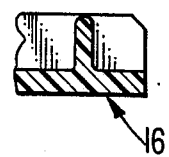
FIG. 14 is a sectional view of the transverse end member taken along line 14—14 of FIG. 14.

In FIGS. 3, 4, 9, and 10, the dimension running left-right is the length, the up-down dimension is the width, and the dimension in and out of the page is the depth. While the ends of transverse end members 16, 18 are formed to perform rabbeting, a portion of their ends does not function in that manner. Rather, transverse end members 16 and 18 are formed to their full depth at their outside edge along their entire length to further strengthen dolly 10, as best shown in FIGS. 2 and 13. This full depth portion at end portions 20 of transverse end members 16, 18 does not have cutout or removed portions to perform rabbeting. This full depth portion at the end portions forms transverse projecting portion 38. As shown in FIGS. 3 and 4, longitudinal side members 12, 14 have longitudinal cutout portion 40 at their respective end portions 20 to accommodate transverse projecting portions 38 of transverse end members 16, 18. Thus, at each end portion 20 of longitudinal side members 12, 14, longitudinal cutout portion 40 is a removed portion of the width. This forms longitudinal projecting portion 42. Longitudinal cutout portion 40 accommodates and mates with transverse projecting portion 38 at the end of transverse end members 16, 18.

To further accomplish rabbeting lap joints 22, longitudinal side members 12, 14 are formed with upper longitudinal recesses 44, and transverse end member 16, 18 are formed with complementary lower transverse recesses 46 at their respective end portions 20. Also, transverse end members 16, 18, are shortened an amount sufficient to fit complementarily against longitudinal projecting portions 42 which include the end portions of reinforcement element 32 for additional rigidity to the lap joint area. Thus, transverse end members 16, 18 are shorter than the dolly side of which they are part.

As best shown in FIG. 2 (in which the strengthening rib structure is omitted from the surface forming lower transverse recess 46) an additional locking and securing device for strengthening the connection between end portions 20 of respective longitudinal side members 12, 14 and respective transverse end members 16, 18 is shown. This device includes triangular locking projections 50 and complementary triangular locking slots 52. As shown, three locking projections 50 are disposed along one side surface of upper longitudinal recess 44 and three locking slots 52 are disposed along the corresponding side surface of lower transverse recess 46. Similarly, two locking projections 50 are disposed along another side surface of lower transverse recess 46 and two locking slots 52 are disposed along the corresponding side surface of upper longitudinal recess 44. In practice, any number of projection-slot pairs may be used. Alternatively, all of the locking projections 50 may be disposed on one of either longitudinal transverse recess 44 or transverse end recess 46, with all of the locking slots 52 disposed in the other recess. However, it is preferable to dispose both locking projections 50 and locking slots 52 in each recess.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

I claim:

1. A plastic dolly comprising:
   a pair of longitudinal side members having end portions, said end portions having an opening for receiving a caster bolt;
   a pair of transverse end members having end portions, said end portions having an opening for receiving a caster bolt;
   said end portions of both said longitudinal side members and said transverse end members interfitting to forma a lap joint coupling said longitudinal side members and said transverse end members to form a frame, said lap joint being formed by overlapping substantially the entire said end portions of respective said longitudinal side members and and said transverse end members and by mating an upper longitudinal recess of said longitudinal side member and a lower transverse recess of said transverse end member, said lap joints being securely fastened together at the corners of said frame; and
   said end portions of both said longitudinal side members and said transverse end members are rabbeted and each said end portion of said longitudinal side members is formed having a longitudinal cutout portion and a longitudinal projecting portion which form a space in which a complementary transverse projecting portion of each said end portion of said transverse end members can extend to its full depth for strengthening said lap joint, said longitudinal cutout portion being a portion along the entire depth of each end of said longitudinal side member that is totally removed, wherein said upper longitudinal recess of said longitudinal side members encompasses substantially the entire area of said end portions of said longitudinal side members except for said longitudinal projecting portion, and said lower transverse recess of said transverse end members encompasses substantially the entire area of said end portions of said transverse end members except for said transverse projecting portion.

2. A plastic dolly as set forth in claim 1 wherein said longitudinal side members and said transverse end members are formed of high density polyethylene and at least one member is formed having a plurality of strengthening ribs extending substantially along their length and located on their undersides.

3. A plastic dolly as set forth in claim 2 wherein said end portions of both said longitudinal side members and said transverse end members comprise locking means for matingly securing corresponding said end portions together.

4. A plastic dolly as set forth in claim 3 wherein said locking device comprises a locking projection disposed on one said end portion and a locking slot disposed in a corresponding location on a mating said end portion, said locking projection and said locking slot mating to secure corresponding said end portions together.

5. A plastic dolly as set forth in claim 4 wherein at least one said locking projection is disposed on each said end portion of said longitudinal side members and at least one said locking slot is disposed at a corresponding location on each said end portion of said transverse end members.

6. A plastic dolly as set forth in claim 4 wherein at least one said locking projection is disposed on each said end portion of said transverse end members and at least one side locking slot is disposed at a corresponding location on each said end portion of said longitudinal end members.

7. A plastic dolly as set forth in claim 4 wherein at least one said locking projection and at least one said locking slot are disposed on each said end portion of said longitudinal side members and at least one said locking slot and at least one said locking projection are disposed at corresponding locations on each said end portion of said transverse end members.

8. A plastic dolly as set forth in claims 1, 2, or 7 further comprising reinforcement menas for reinforcing and strengthening at least one said longitudinal side member.

9. A plastic dolly as set forth in claim 8 wherein said reinforcement means comprises a metal bar.

10. A plastic dolly as set forth in claim 9 wherein a groove is formed longitudinally in said at least one said longitudinal side member and said metal bar is disposed within said groove.

11. A plastic dolly as set forth in claim 10 wherein said groove and said metal bar extend along substantially the entire length of said at least one said longitudinal side member.

12. A plastic dolly as set forth in claim 11 wherein said groove is disposed adjacent the outside edge of said at least one said longitudinal side member.

13. A plastic dolly as set forth in claim 8 wherein said reinforcement means comprises a U-shaped metal channel.

14. A plastic dolly as set forth in claim 13 wherein a groove is formed longitudinally in said at least one said longitudinal side member and said U-shaped metal channel is disposed within said groove.

15. A plastic dolly as set forth in claim 14 wherein said U-shaped metal channel is riveted to said longitudinal side member.

16. A plastic dolly as set forth in claim 15, wherein said groove and said metal bar extend along substantially the entire length of said at least one said longitudinal side member.

17. A plastic dolly as set forth in claim 16 wherein said groove is disposed adjacent the outside edge of said at least one said longitudinal side member.

18. A plastic dolly as set forth in claim 8 wherein said reinforcement means comprises a plurality of nonpyramidal-shaped ribs, said plurality of ribs combining to form a pyramidal-shaped cross section formed by providing said ribs with greater depths in the direction toward the center of said at least one said longitudinal side member to form a downwardly facing pyramidal shape.

19. A plastic dolly as set forth in claim 1, 2, or 7 further comprising reinforcement means for reinforcing and strengthening at least one said transverse end member.

20. A plastic dolly as set forth in claim 19 wherein said reinforcement means comprises a metal bar.

21. A plastic dolly as set forth in claim 19 wherein said reinforcement means comprises a U-shaped metal channel.

22. A plastic dolly as set forth in claim 21 wherein a groove is formed longitudinally in said at least one said transverse side members and said U-shaped metal channel is disposed within said groove.

23. A plastic dolly as set forth in claim 22 wherein said U-shaped metal channel is riveted to said transverse end member.

24. A plastic dolly as set forth in claim 23 wherein said groove and said U-shaped metal channel extend along substantially the entire length of said at least one said transverse end member.

25. A plastic dolly as set forth in claim 24 wherein said groove is disposed adjacent the outside edge of said at least one said transverse end member.

26. A plastic dolly as set forth in claim 19 wherein said reinforcement means comprises a plurality of non-pyramidal-shaped ribs, said plurality of ribs combining to form a pyramidal-shaped cross section formed by providing said ribs with greater depths in the direction toward the center of said at least one transverse end member to form a downwardly facing pyramidal shape.

27. A plastic dolly as set forth in claim 1 wherein said transverse end members having a length less than the distance between the outer edges of said pair of longitudinal side members, the reduced length being equal to the width of said longitudinal projecting portions of said end portions of said longitudinal side members.

28. A plastic dolly as set forth in claim 17 wherein said transverse end members are shortened at each end an amount equal to the width of said longitudinal projecting portions of said end portions of said longitudinal slot members.

29. A plastic dolly as set forth in claim 26 wherein said transverse end members are shortened at each end an amount equal to the width of said longitudinal projecting portions of said end portions of said longitudinal side members.

30. A plastic dolly comprising:
a pair of longitudinal side members having end portions, each said end portion having an opening for receiving a caster bolt and having a groove formed longitudinally adjacent the outside end and along substantially the entire length of said longitudinal side member;
a pair of transverse end members having end portions, said end portions having an opening for receiving a caster bolt;
said end portions of both said longitudinal side members and said transverse end members interfitting to form a lap joint coupling said longitudinal side members and said transverse end members to form a frame, said lap joint being formed by overlapping substantially the entire said end portions of respective said longitudinal side members and said transverse end members and by mating an upper longitudinal recess of said longitudinal side member and a lower transverse recess of said transverse end member, said lap joints being securely fastened together at the corners of said frame, said end portions of both said longitudinal side members and said transverse end members are rabbeted and said end portions of said longitudinal side members are formed having longitudinal cutout portions and longitudinal projecting portions which form a space in which complementary transverse projecting portions of said end portions of said transverse end members can extend to their full depth along their entire length for strengthening said lap joint, said longitudinal cutout portion being a portion along the entire depth of each end of said longitudinal side member that is totally removed, wherein said upper longitudinal recess of said longitudinal side members encompasses substantially the entire area of said end portions of said longitudinal side members except for said longitudinal projecting portion, and said lower transverse recess of said transverse end members encompasses substantially the entire area of said end portions of said transverse end members except for said transverse projecting portion and said transverse end members have a length less than the distance between the outer edges of said pair of longitudinal side members, the reduced length being equal to the width of said longitudinal projecting portions of said end portions of said longitudinal side member;
said longitudinal side members and said transverse end members being formed of high density polyethylene and being formed having a plurality of ribs extending substantially along their length and located on their undersides;
reinforcement means for reinforcing and strengthening said longitudinal side members, said reinforcement means comprising a U-shaped metal channel disposed in each said groove and rivted to said longitudinal side member;
reinforcement means for reinforcing and strengthening said transverse end members, said reinforcement means comprising a plurality of non-pyramidal-shaped ribs, said plurality of ribs combining to form a pyramidal-shaped cross section formed by providing said ribs with greater depths in the direction toward the center of said transverse end members to form a downwardly facing pyramidal shape; and
locking devices disposed on the end portions of both said longitudinal side members and said transverse end members, said locking device comprising a locking projection and a locking slot wherein at least one said locking projection and at least one said locking slot are disposed on each said end portion of said longitudinal side members and at least one said locking slot and at least one said locking projection are disposed at corresponding locations on each said end portion of said transverse end members.

* * * * *